United States Patent [19]

Meyer et al.

[11] Patent Number: 4,743,709
[45] Date of Patent: May 10, 1988

[54] GAS INSULATED TRANSMISSION LINE WITH SUPPORT INSULATOR HARDWARE ARRANGEMENTS

[75] Inventors: Jeffry R. Meyer, Penn Hills Township, Allegheny County, Pa.; Albert P. Munroe, Southborough, Mass.; Melvyn D. Hopkins, Grafton, Mass.; Gary K. Bowman, Westboro, Mass.; Richard E. Kane, Northborough, Mass.

[73] Assignee: Westinghouse Electric Corp., Pittsburgh, Pa.

[21] Appl. No.: 114,476

[22] Filed: Oct. 30, 1987

[51] Int. Cl.$^4$ .......................... H02G 5/06; H01B 9/06
[52] U.S. Cl. .................................. 174/28; 174/14 R; 174/99 B
[58] Field of Search .................... 174/14 R, 28, 99 R, 174/99 B

[56] References Cited

U.S. PATENT DOCUMENTS

Re. 31,949  7/1985  Hopkins ........................... 174/14 R

FOREIGN PATENT DOCUMENTS 822260  11/1951  Fed. Rep. of Germany .... 174/99 R

OTHER PUBLICATIONS

Westinghouse Descriptive Bulletin 33-650, "Type CGI Compressed Gas Insulated Bus", Jun. 1982, pp. 1-8.
Westinghouse Drawing ID 12147, "CGIT Tripost Insulator Outline", 7/17/86.

Primary Examiner—Laramie E. Askin
Attorney, Agent, or Firm—G. H. Telfer

[57] ABSTRACT

A gas insulated transmission line has an inner conductor supported by insulators including a fixed insulator and a movable insulator with each having recesses in their outer portion having recessed metallic inserts therein of like configuration. The fixed insulator has disposed within the insert a base of an interconnection strap that extends along the sheath and is welded thereto. An insulating standoff button is further provided on the exterior of the base of the interconnection strap and presses against the outer sheath. An insert of the movable insulator contains a roller assembly. Preferably the roller assembly includes a substantially cylindrical roller of a semi-rigid insulating material that has edges bearing against the outer sheath and conforming to the configuration of the outer sheath by reason of deformation under load.

5 Claims, 2 Drawing Sheets

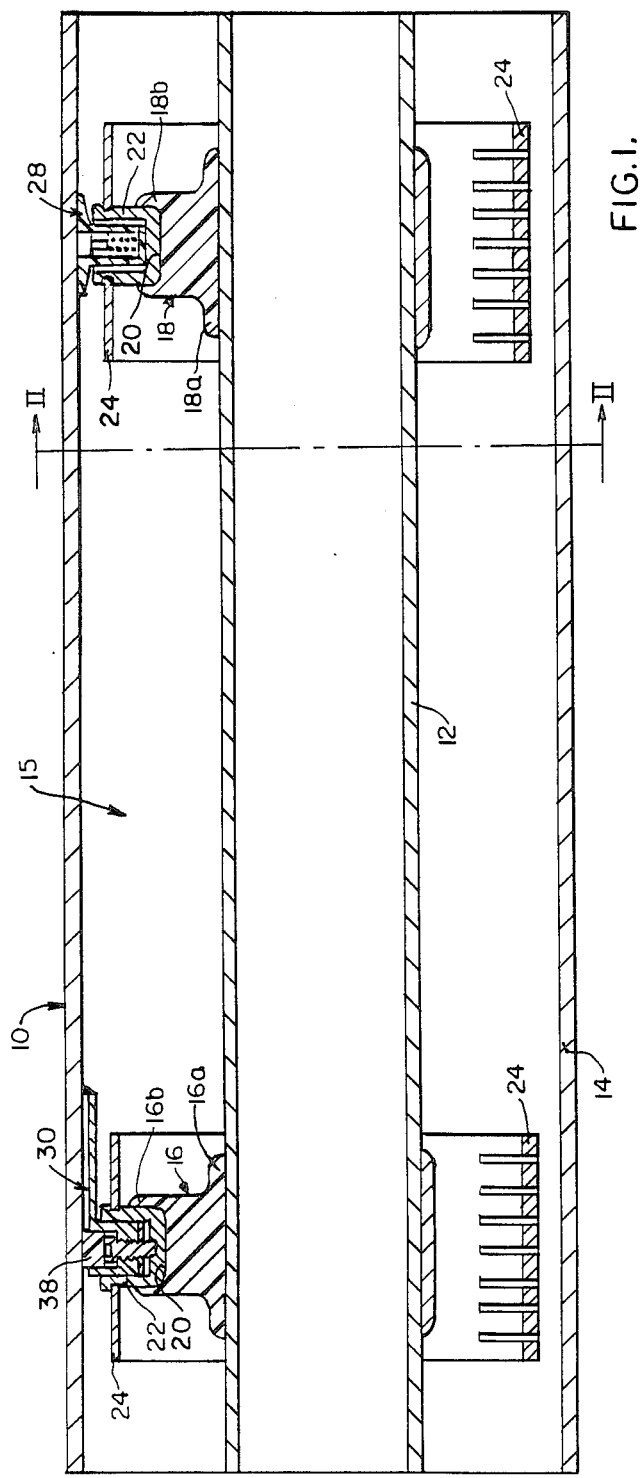
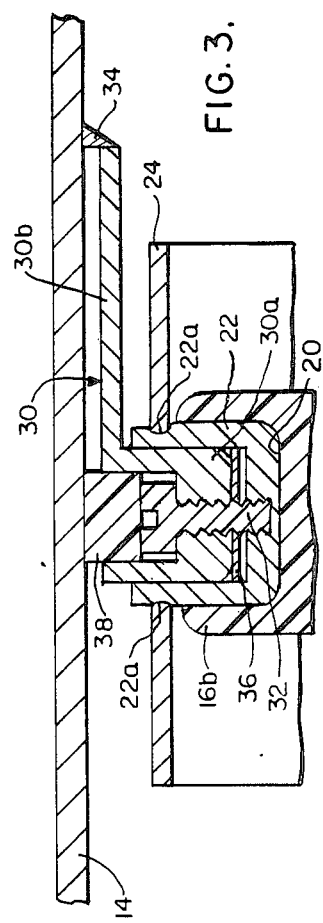

GAS INSULATED TRANSMISSION LINE WITH SUPPORT INSULATOR HARDWARE ARRANGEMENTS

BACKGROUND AND SUMMARY OF THE INVENTION

This invention relates to gas insulated transmission lines in which an inner conductor is provided concentrically within an outer sheath with a gaseous insulation medium therebetween and particularly to arrangements in which solid insulators support the inner conductor in relation to the outer sheath.

It is a practice for the inner conductor to have support insulators at axially spaced locations. A typical support insulator is cast circumferentially around the inner conductor, or onto a metal sleeve into which the conductor is inserted, and has three uniformly spaced posts or legs, referred to as a tri-post arrangement, extending toward the outer sheath. One insulator, usually at an end of the transmission line, is rigidly attached to the outer sheath. Others of the insulators are preferably not rigidly attached to the outer sheath in order to permit relative axial movement between the inner conductor and the outer sheath due to thermal effects.

The hardware for a movable insulator and the hardware for a fixed insulator have each previously required distinct metal elements cast intimately with the insulator. The movable insulator is characterized by having a metal casting disposed within a recess at the extremity of an insulator leg. The metal casting has a cup-shaped configuration and it further provides means for holding hardware including a roller element that allows the movable insulator and conductor to be rolled into place and to move in service. Reference is made to Hopkins U.S. Pat. No. Re. 31,949, July 16, 1985, for examples of such cast-in inserts and their assemblies. On the other hand, the fixed insulator has been characterized by having a casting that has a substantially flat surfaced insert without a recess in the manner of the movable insulator but with a tapped hole for securing to it a strap which then extends to the outer sheath and is joined such as by welding.

Rollers of a non-metallic material have been employed in accordance with the above-mentioned patent. The rollers were of nylon material, for example, which helps to minimize the risk of loose particles being produced by their movement that could lead to an electrical breakdown of the insulation medium. In the past the rollers were machined to a surface configuration with a curvature substantially matching that of the outer sheath. This has required variations in the rollers to match each of the differently sized outer sheaths.

The present invention has as one of its objects to simplify the construction of compressed gas insulated transmission lines by minimizing the number of different hardware elements required. It is desired both to reduce the numbers of kinds of parts required on a single transmission line and also to reduce the numbers of kinds of parts required for various size transmission lines.

An improvement is achieved by modifying the cast-in insert of the stationary insulator so it is a cup-shaped element which is the same as for the movable insulator. The insert is configured with a recess so as to permit its use with a roller for the movable insulator. For the fixed insulator a metallic strap interconnector is secured by a fastener to the insert. The thicker, base portion of the strap is in direct engagement with the insert and an extended strap portion extends away from the insert. The extremity of the extended strap portion is joined, such as by welding, to the outer sheath. A button of a suitable non-metallic material, such as nylon, is pressed into a hole within the strap base portion to prevent particle generation during assembly of the insulator into the outer sheath during which time the assembly rides on the button which also provides a cushion and wear point during operation.

A further improvement is achieved by making rollers for the movable insulators that initially, as made and installed, have a simple cylindrical configuration and are not machined to conform to the curvature of the outer sheath. Such rollers may be used with various sized outer sheaths. In use, they exhibit a degree of plastic deformation which is itself, without machining, enough shaping to provide adequate support and roller functioning.

The design allows easy assembly and disassembly for repair or revision and minimizes the inventory required for components and spare parts.

THE DRAWING

FIG. 1 is a cross sectional view of a gas insulated transmission line in accordance with an embodiment of the present invention;

FIG. 3 is a partial cross sectional view showing details of an assembly of a fixed insulator in relation to an outer sheath of the structure of FIG. 1.

PREFERRED EMBODIMENTS

Figure 2:
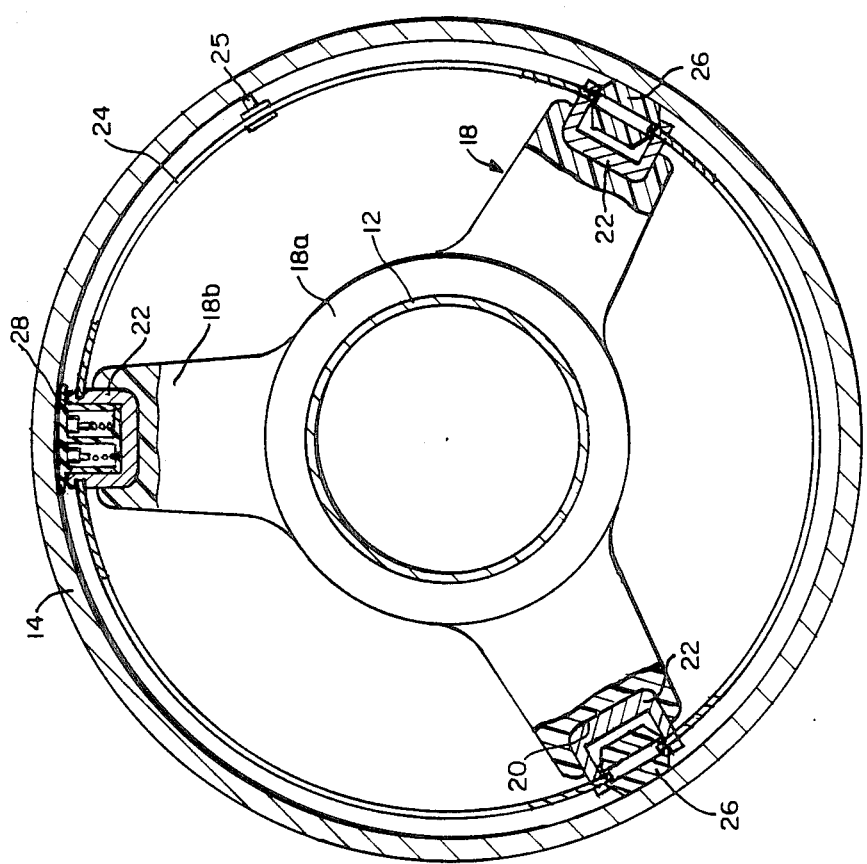
FIG. 2 is a cross sectional view with parts broken away taken along line II—II of FIG. 1.

FIG. 1 illustrates a gas insulated transmission line 10 comprising a central or inner conductor 12 spaced from an outer conductive sheath 14 with an insulating medium 15 such as $SF_6$ gas disposed therebetween. The inner conductor 12 may be in segments with electrical joints (not shown) that allow for thermal expansion. Insulating support means is provided for supporting the inner conductor 12 in relation to the outer sheath 14 and normally includes at least one fixed insulator 16 and at least one movable insulator 18. The fixed and movable insulators 16 and 18 have substantially the same general configuration which in this example is a tri-post configuration as shown in FIG. 2 for movable insulator 18. Other configurations are also suitable. Each insulator 16 or 18 has an inner portion 16a or 18a affixed to the inner conductor 12 and also an outer portion 16b or 18b. The outer portions 16b and 18b of each have a recess 20 with a metal insert 22 lining the recess. As shown in FIG. 2, such an insert 22 is provided in the outer portion 18b of each post of the tri-post insulator. The metal inserts 22 are preferably each of a metal such as aluminum. Each insert 22 supports a particle trap 24 in accordance with known practice.

The movable insulator 18, as shown in FIG. 2, has a roller assembly 26 in two of its inserts 22 and a contact assembly 28 in the third insert, such as illustrated and described in above-mentioned U.S. Pat. No. Re. 31,949. The roller assemblies 26 preferably incorporate the features of FIGS. 4A and 4B.

Referring to FIG. 3, it is seen that the insert 22 for the fixed insulator 16 has secured to it strap interconnector 30 which is of a substantially L-shaped configuration. A base portion 30a of the interconnector fits within the insert 22 and is secured to it in conductive engagement such as by a fastener or bolt 32 that passes through the interconnector base 30a into a tapped hole in the insert 22. The interconnector 30 also has an extended strap portion 30b extending laterally away from the insulator 18 to a point at which it is secured by a weldment 34 to the outer sheath 14. There is also shown a shoulder 22a in the outer surface of the insert 22 so as to support a particle trap 24 as has been used heretofore to minimize the movement of metal particles throughout the structure that could result in an electrical breakdown of the insulating gas.

In the arrangement shown in FIG. 3, there is also a wave washer 36 between the insert 22 and the base portion 30a of the interconnector 30 and an insulative standoff button 38 is inserted within the recess accommodating the fastener 32. The standoff button 38 bears against the outer sheath 14 and is of a non-metallic material such as nylon material so as to permit the insulator structure to be slid in place with minimal particle formation, before the weld 34 at the end of the strap portion 30b is formed. Each leg of a fixed insulator 16 is preferably given the same assembly as shown in FIG. 3.

By way of further example, the strap portion 30b may extend about eight inches from the base 30a of the interconnector and its cross section may be about ⅛ inch by 1 inch. The insert 22 may have an inner diameter of about ½ inch. More particularly, it may have a recess diameter at the bottom of 0.53 inch with a 1° taper out. The fastener holding the interconnector in place may be a ¼-20 Allen head bolt. The standoff button may have about a ¼ inch diameter.

The interconnector strap 30 may be a casting. Each of the three legs of a fixed tri-post insulator 16 should have the same configuration of hardware elements.

It is important that there be electrical continuity from the particle trap 24 to the outer sheath 14. In the arrangement shown, the particle trap 24 has holes sized properly to be placed over the insert shoulders 22a and force fitted to mechanically and electrically connect the trap 24 to the insert 22 without additional hardware. The trap 24 is assembled onto the insulator as an incomplete ring and the joint of the ring is then connected by, for example, spot welds, rivets or round head bolts 25 (shown in FIG. 2; the particle trap attachment being the same for both of the fixed and movable insulators).

In the movable insulators 18, two of the legs will normally have inserts 22 with roller assemblies and a third would have a contact button assembly such as in accordance with the above referred to reissue patent; generally as shown at 28 in FIG. 1.

Figure 4A:
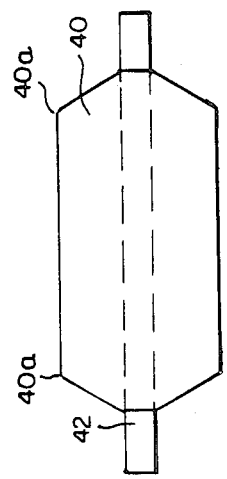
FIGS. 4A and 4B are elevation views showing a roller for a movable insulator in its initial form and after use, respectively.
Figure 4B:
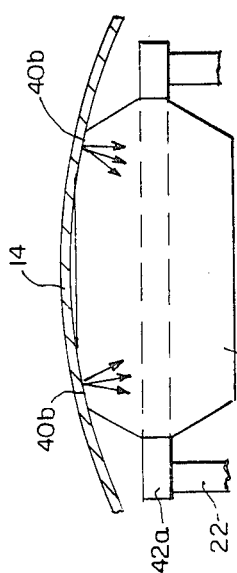

FIGS. 4A and 4B show an improved form of roller 40 for use in the roller assemblies 26 of the movable insulator 18 shown in FIG. 2. The roller 40 is supported by insert 22 in the same manner as formerly, i.e., after the trpa 24 has been pressed into the inserts 22, the rollers 40 on their center pins or axles 42 being joined by pressing the pin ends 42a into notches in the inserts 22 in a force fit. The trap 24 is peened, if necessary, to hold the roller pin in place.

Formerly, rollers were machined to conform to the curvature of the outer sheath 14. FIG. 4A shows the improvement of having the roller 40 cylindrical without any machining. All rollers 40 used may have the same configuration and the machining step is avoided. The same roller material, such as nylon, may be used as formerly. Such a material is fairly firm or semi-rigid but is subject to plastic deformation in use for the purpose shown here.

As seen in FIG. 4B, the former edges 40a (FIG. 4A) of the roller 40 have been permanently deformed (undergoing plastic deformation) from their original shape to a smoothly deformed shape 40b under the load of rolling an assembled inner conductor 12 and insulator(s) 18 in place within a sheath 14. The arrows indicate the load distribution. The distribution of load to the end areas of the pin helps ensure against bending of the pin 42. Also, this allows a smaller diameter pin with less rolling friction while still minimizing pin bending, allowing a tighter diametral fit between roller and pin.

By way of example, rollers 40 may be about 1 inch long with an inner diameter of about 0.3 inch and an outer diameter of 0.8 inch. The angle for the tapered surface may be about 40°.

It is therefore seen that considerable simplification and ease of manufacture and repair by reduction of parts has been achieved.

We claim:
1. A gas insulated transmission line comprising:
a central conductor spaced from an outer conductive sheath with a gaseous insulating medium therebetween;
insulating support means supporting said inner conductor within said outer sheath, said support means comprising a solid insulator having an inner portion attached to said inner conductor and an outer portion;
said outer portion of said solid insulator having a recess, a metal insert lining said recess;
a metal interconnector having a base portion within said insert in conductive engagement therewith and a strap portion extending away from said insert;
fastener means securing said base portion of said interconnector to said insert;
an insulating standoff button disposed within a recess of said interconnector base portion and bearing against said outer sheath; and
said strap portion of said interconnector having an extremity affixed to said outer sheath.

2. A gas insulated transmission line in accordance with claim 1 wherein:
said support means further comprises a second solid insulator having an inner portion attached to said inner conductor and an outer portion;
said outer portion of said second solid insulator having a recess, a metal insert lining said recess, said configuration of said second solid insulator, with said recess, and said metal insert lining said recess matching that of the first mentioned solid insulator;
a roller assembly disposed within said metal insert of said second solid insulator and extending outwardly contacting said outer sheath.

3. A gas insulated transmission line in accordance with claim 2 wherein:
said roller assembly comprises a roller of a semi-rigid insulating material on an axle secured to said metal insert, said roller having a central portion of substantially cylindrical configuration with edges of said central portion bearing against said outer sheath and deforming under load to conform to said outer sheath.

4. A gas insulated transmission line comprising:

a central conductor spaced from an outer conductive sheath with a gaseous insulating medium therebetween;

insulating support means supporting said inner conductor within said outer sheath, said support means comprising a solid insulator having an inner portion attached to said inner conductor and an outer portion;

said outer portion of said solid insulator having a recess, a metal insert lining said recess;

an axle pin secured to said metal insert, a roller body of a semi-rigid insulating material having a central portion of substantially cylindrical configuration disposed on said axle pin, said roller body having edges bearing against said outer sheath and deforming under load to conform to said outer sheath.

5. A gas insulated transmission line in accordance with claim 4 wherein;

said roller body has tapered end portions on opposite ends of said central portion, said tapered end portions have an enlarged length relative to said central portion on said axle, and the deforming of said central portion edges distributes load along said axle.

* * * * *